(12) United States Patent
Stone et al.

(10) Patent No.: US 8,458,159 B2
(45) Date of Patent: Jun. 4, 2013

(54) AUTOMATIC ROLE DETERMINATION FOR SEARCH CONFIGURATION

(75) Inventors: Brion Stone, Redmond, WA (US); Victoria Taranov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 199 days.

(21) Appl. No.: 12/774,193

(22) Filed: May 5, 2010

(65) Prior Publication Data

US 2011/0276583 A1 Nov. 10, 2011

(51) Int. Cl.
*G06F 17/30* (2006.01)

(52) U.S. Cl.
USPC .......................................... 707/706; 707/769

(58) Field of Classification Search
USPC .................................. 707/706, 769
See application file for complete search history.

(56) References Cited

U.S. PATENT DOCUMENTS

| | | | | |
|---|---|---|---|---|
| 6,334,125 B1* | 12/2001 | Johnson et al. | ............. | 707/713 |
| 6,396,842 B1* | 5/2002 | Rochberger | ............. | 370/408 |
| 6,654,749 B1* | 11/2003 | Nashed | ............. | 707/706 |
| 6,789,090 B1 | 9/2004 | Miyake et al. | | |
| 7,080,059 B1* | 7/2006 | Poston et al. | ............. | 707/769 |
| 7,146,356 B2* | 12/2006 | Choi et al. | ............. | 707/706 |
| 7,340,520 B1 | 3/2008 | Jordan et al. | | |
| 7,698,327 B2* | 4/2010 | Kapur | ............. | 707/706 |
| 7,702,630 B2* | 4/2010 | Basso et al. | ............. | 707/769 |
| 2005/0270986 A1 | 12/2005 | Watanabe et al. | | |
| 2006/0053096 A1* | 3/2006 | Subramanian et al. | ............. | 707/3 |
| 2006/0294073 A1 | 12/2006 | Hamadi | | |
| 2007/0016592 A1 | 1/2007 | Ferla et al. | | |
| 2009/0249213 A1 | 10/2009 | Murase et al. | | |
| 2010/0238517 A1* | 9/2010 | Kashiwa | ............. | 358/452 |
| 2011/0019586 A1* | 1/2011 | Ettle et al. | ............. | 370/254 |
| 2011/0173616 A1* | 7/2011 | Lattmann et al. | ............. | 718/1 |

FOREIGN PATENT DOCUMENTS

| | | |
|---|---|---|
| JP | 08241329 A | 9/1996 |
| JP | 2005352874 A | 12/2005 |
| JP | 2008052378 A | 3/2008 |

OTHER PUBLICATIONS

Stuyvesant, Ray., "Sharepoint Topology and Performance", Retrieved at << http://csiwebservices.net/Documents/SPS%20Reference/SPS%20Topology%20and%20Performance.doc >>, Oct. 3, 2005, pp. 11.

"What's New in Enterprise Search (SharePoint Server 2010)", Retrieved at << http://technet.microsoft.com/en-us/library/ee667266(office.14).aspx >>, Retrieved Date: Mar. 8, 2010, pp. 5.

"Manage Search Topology", Retrieved at << http://technet.microsoft.com/en-us/library/ee805956(office.14).aspx >>, Nov. 12, 2009, p. 1.

(Continued)

*Primary Examiner* — Kim Nguyen
(74) *Attorney, Agent, or Firm* — Turk IP Law, LLC

(57) ABSTRACT

A mechanism for automatically laying out a search topology and assisting administration of the system in a shared services environment is provided. A search configuration wizard user interface may prompt an administrator to specify a number of items to be supported by the search system on initial search application topology configuration, as well as selections between high-availability or high throughput options. A topology manager managing the search configuration wizard may determine how many servers are needed upon receiving configuration options and create specific search components on available servers to optimize query and crawl performance for the system.

20 Claims, 6 Drawing Sheets

OTHER PUBLICATIONS

Baer, Bill., "Step-by-Step: Provisioning the Search Service Application", Retrieved at << http://blogs.technet.com/wbaer/archive/2009/11/23/step-by-step-provisioning-the-search-service-application.aspx >>, Nov. 23, 2009, pp. 7.

"International Search Report", Mailed Date: Oct. 31, 2011, Application No. PCT/US2011/032812, Filed Date: Apr. 17, 2011, pp. 9.

* cited by examiner

AUTOMATIC ROLE DETERMINATION FOR SEARCH CONFIGURATION

BACKGROUND

Shared web services are increasingly becoming popular. Some shared web services provide an integrated suite of server capabilities that can help improve organizational effectiveness by enabling comprehensive content management and enterprise search, accelerating shared business processes, and facilitating information-sharing across boundaries for enhanced business insight. Additionally, the collaboration and content management servers may provide information technology professionals and developers with a platform and tools they may need for server administration, application extensibility, and interoperability.

In some shared services, the infrastructure may include deployment of search services to multiple server farms. However, deployment and management of shared services and the provider topology may be difficult to administer. The challenge may become even more complex with the partitioning of the search index to support higher scaling.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a mechanism for automatically laying out a search topology and assisting administration of the system. According to some embodiments, a search configuration wizard user interface may prompt an administrator to specify a number of items to be supported by the search system on initial search application topology configuration, as well as selections between high-availability or high throughput options. A topology manager managing the search configuration wizard may determine how many servers are needed upon receiving configuration options and create specific search components on available servers to optimize query and crawl performance for the system.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
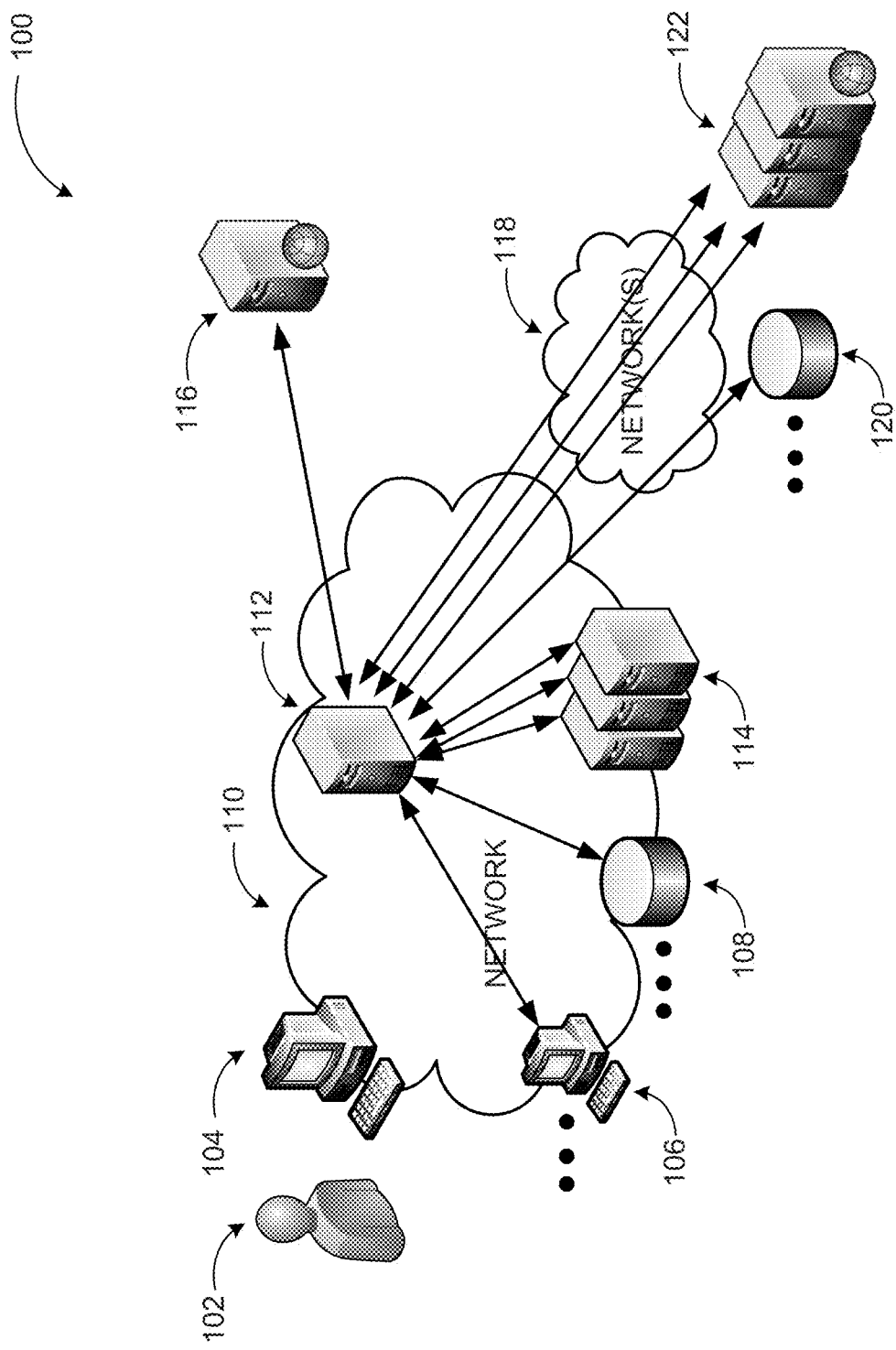
FIG. 1 is a conceptual diagram illustrating a networked shared services environment where search topology may be configured according to embodiments.

As briefly described above, a search topology may be automatically laid out and administration of a shared services system assisted by a topology manager controlled search configuration wizard on initial search application topology configuration. The search configuration wizard user interface may prompt an administrator to specify a number of items to be supported by the search system and selections between high-availability or high throughput options. The topology manager may determine how many servers are needed and identify them upon receiving configuration options. The topology manager may further create specific search components on available servers to optimize query and crawl performance for the system. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing computer and network operations, which may include searches. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes conceptual diagram 100 illustrating a networked shared services environment where search topology may be configured according to embodiments. The networked search environment shown in diagram 100 is for illustration purposes. Embodiments may be implemented in various networked environments such as enterprise-based networks, cloud-based networks, and combinations of those.

Fueled by the explosive growth of e-commerce, web analytics is increasingly adopted by businesses and other organizations. Web Analytics tracks user actions. Dynamic Search Configuration uses system monitoring, which includes data derived from serving user requests, as well as data gathered from providing the search service, to make decisions.

For delivering actionable intelligence to its users, shared service systems may adopt a coherent strategy addressing business and technological needs, and improving Internet, extranet, and intranet-based sites and solutions. One aspect of providing shared services to users is configuring server farms for efficient search operations within the information technology infrastructure of departments and across entire enterprises.

While a shared services system such as the example one illustrated in diagram 100 may provide a variety of services, properties and configuration of the components are focused on search operations for relevancy purposes. A shared services system may include a plurality of servers and other devices such as data stores, routing devices, balancing devices, and the like. Different aspects of the provided services may be managed by different servers. For example, server 112 and/or servers 114 may be responsible for search operations. Search operations may include crawling (and searching) resources of the system such as client devices 104, 106; data sources 108, 120; servers 116 and 122. Some of the resources may be reachable through a single network (e.g. 110), while others may be reachable over a plurality of networks (e.g. 110 and 118). In a typical operation, a user 102 may submit a search request to server 112 (or 114) through their client device 104. Server(s) 112 and/or 114 may host a search application, which may perform various tasks such as crawling, indexing, querying at search time, ranking search results, and providing the search results for presentation to client device 104.

Search operations may be optimized for a search application hosted on server 112 (and/or on other servers 114) by automatically laying out a search topology at setup time through a search configuration wizard and determining roles for system resources. Various servers within the system may have different roles. For example, web servers may maintain searchable logs that may be valuable for business intelligence (e.g. usage, access statistics, etc.), analytics servers may maintain analytics data and reports, database servers may provide access to raw data at managed data sources, etc. Each of the servers in the system may be associated with varying amounts and different complexities of data. For example, searching simple format logs may consume fewer system resources (computing power, memory) compared to multi-dimensional (and potentially large) reports maintained by analytics servers. Each server may also be associated with different amount of data. Thus, when configuring search operations for a system, server 112 and/or 114 may take into account these and other characteristics of the servers (and other resources) in the system. Additionally, server 112 and/or 114 may configure search topology based on expected search parameters such as high-throughput vs. high-availability choices.

The example system in FIG. 1 has been described with specific servers, client devices, device roles, and interactions. Embodiments are not limited to systems according to these example configurations. Search configuration for a networked system may be implemented in configurations employing fewer or additional components and performing other tasks. Furthermore, specific protocols and/or interfaces may be implemented in a similar manner using the principles described herein.

Figure 2:
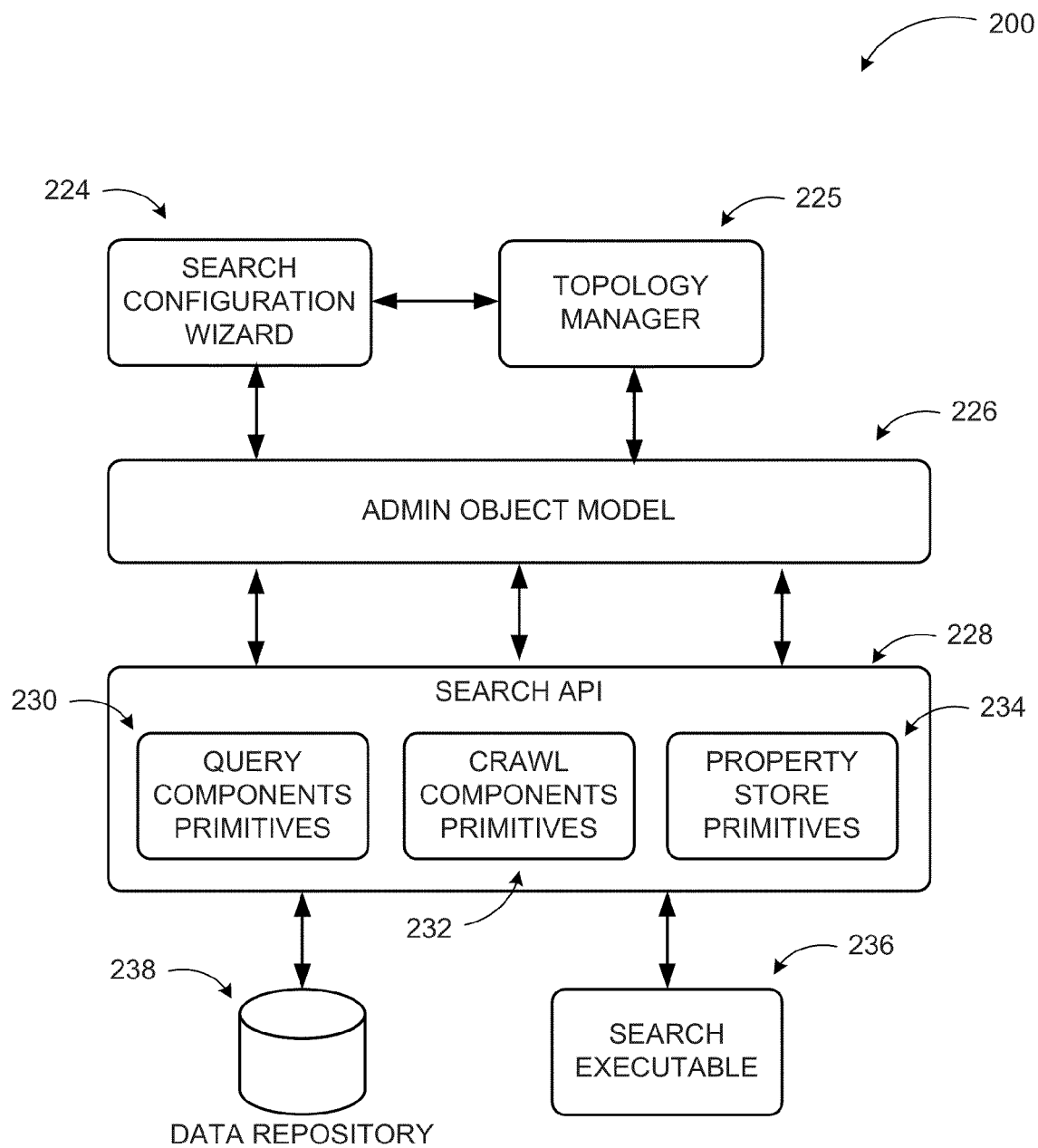
FIG. 2 is a block diagram illustrating search topology configuration operations and components.

FIG. 2 is a block diagram illustrating search topology configuration operations and components. As shown in diagram 200, an example system for configuring search topology may include a topology manager 225 controlling search configuration wizard 224 and administration object model 226. Administration object model 226 may interact with search application programming interface (API) 228, which may provide access to query component primitives 230, crawl component primitives 232, and property store primitives 234. The search application API 228 and the primitives may direct the search executable 236 to perform crawl and search operations when the system is in use performing searches for a variety of purposes as discussed previously.

Search application data repository 238 may store data associated with search operations, as well as the primitives. Search configuration wizard 224 may provide a search configuration user interface at initial setup for an administrator to specify parameters for laying out search topology. Topology manager 225 may subsequently configure servers and applications in the system based on administrator inputs and update the configuration dynamically as the system components and search needs of users change.

Embodiments are not limited to the example components and interactions discussed above. Search topology configuration may be implemented with other components and interactions in a similar manner using the principles described herein.

Figure 3:
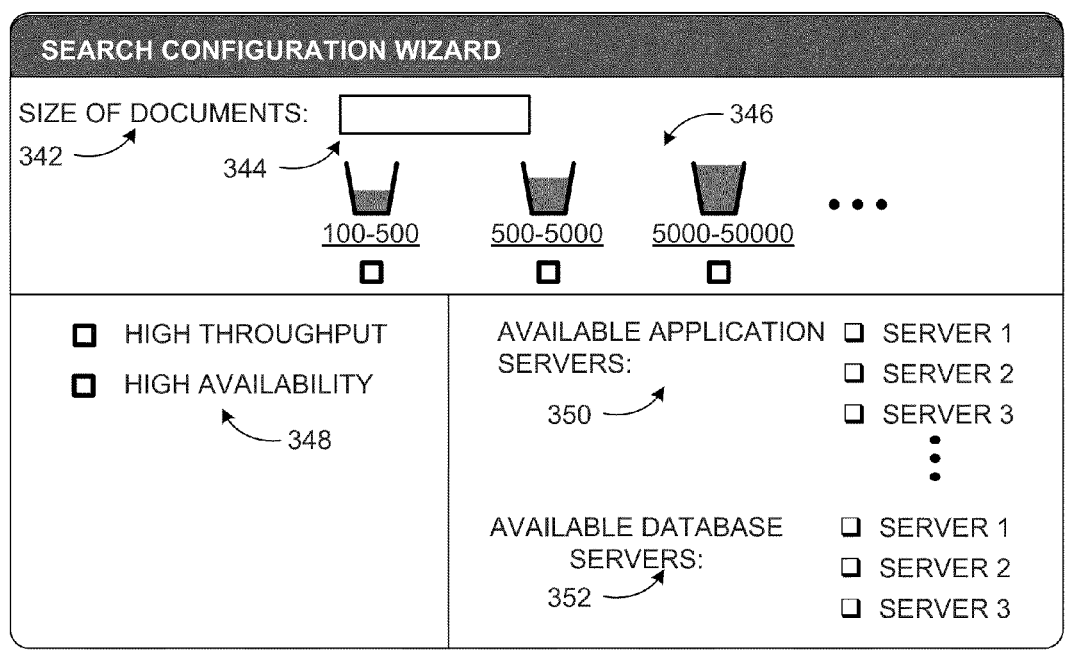
FIG. 3 is an example search configuration wizard user interface.

FIG. 3 is an example search configuration wizard user interface. User interface 300 may be provided to an administrator at initial setup and again when updates are made by the administrator. At least some of the parameters configured through user interface 300 may be automatically updated in response to changes in the system after the initial configuration.

Search configuration wizard user interface 300 enables administrators specify select parameters driving a size and structure of the search system topology before auto-configuring components of the system. The parameters may include size of documents to be searched 342. This parameter may be specified through a text box 344 or by selection among predefined ranges 346. A number and sizes of the displayed ranges may also be dynamically determined based on system characteristics (e.g. sizes and number of available documents in the system).

Additional parameters may include topology choices for the number of servers needed (e.g. available servers 350). For example, the user may be enabled to input a number of servers to be configured to search topology or indicate their choice by selecting among a list of available servers. The search configuration wizard may suggest an optimal number of application and database servers for the search application based on internal lookup tables and/or logic for best configurations of the components and databases. Moreover, the user interface may enable an administrator to define servers for specific roles such as database servers 352.

Choices such as high-throughput and high-availability options (348) may also be selectable. For example, a checkbox representing a high-throughput need may be provided.

When selected, this input may modify the suggested topology by adding additional mirrored query components on new servers to support high-throughput requirements. Selection of a checkbox representing a high-availability need may result in modification of the suggested topology by adding additional "failover" query components on existing servers, which serve queries when an identical "active" query component no longer functions.

Upon completion of inputs through the user interface 300, the search configuration wizard may enable the administrator to confirm (and modify, if desired) the proposed valid search configuration before changing to the next view step of the wizard. After confirmation, the administration object model may create the confirmed topology for the search application.

The example user interface of FIG. 3 includes specific elements such as the document size ranges. Embodiments are not limited to systems according to these example configurations. Automatic role determining and search configuration for networked systems may be implemented with other user interfaces employing additional or fewer configuration elements in a similar manner using the principles described herein.

Figure 4:
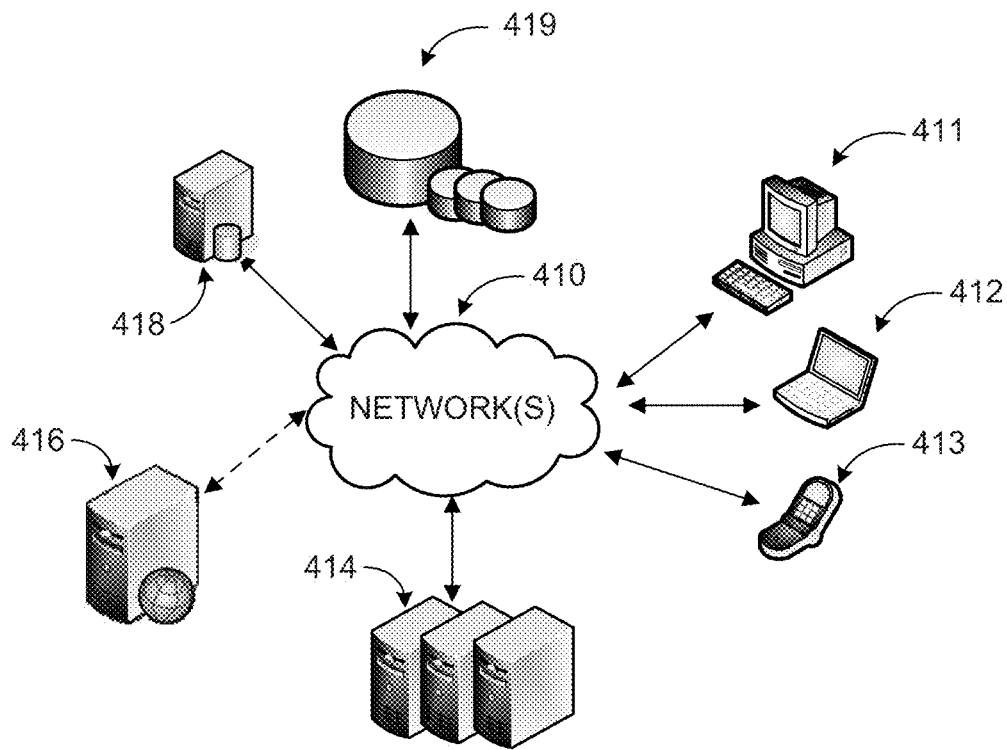
FIG. 4 is a networked environment, where a system according to embodiments may be implemented.

FIG. 4 is an example networked environment, where embodiments may be implemented. A platform providing automatic role determination and search topology configuration in a shared services environment may be implemented via software executed over one or more servers 414 such as a hosted service. The platform may communicate with client applications on individual computing devices such as a smart phone 413, a laptop computer 412, or desktop computer 411 ('client devices') through network(s) 410.

During regular operations, client applications hosted on any of the client devices 411-413 may submit search requests to a search engine on the client device 411-413, on the servers 414, or on individual server 416. The search engine may crawl available networked resources, retrieve data from data sources associated with crawled documents, and index and rank based on collected information. The search topology for may be configured initially through a search configuration wizard as discussed previously. The service may retrieve relevant data from data store(s) 419 directly or through database server 418, and provide the ranked search results to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a framework for search topology configuration. Furthermore, the networked environments discussed in FIG. 4 are for illustration purposes only. Embodiments are not limited to the example applications, modules, or processes.

Figure 5:
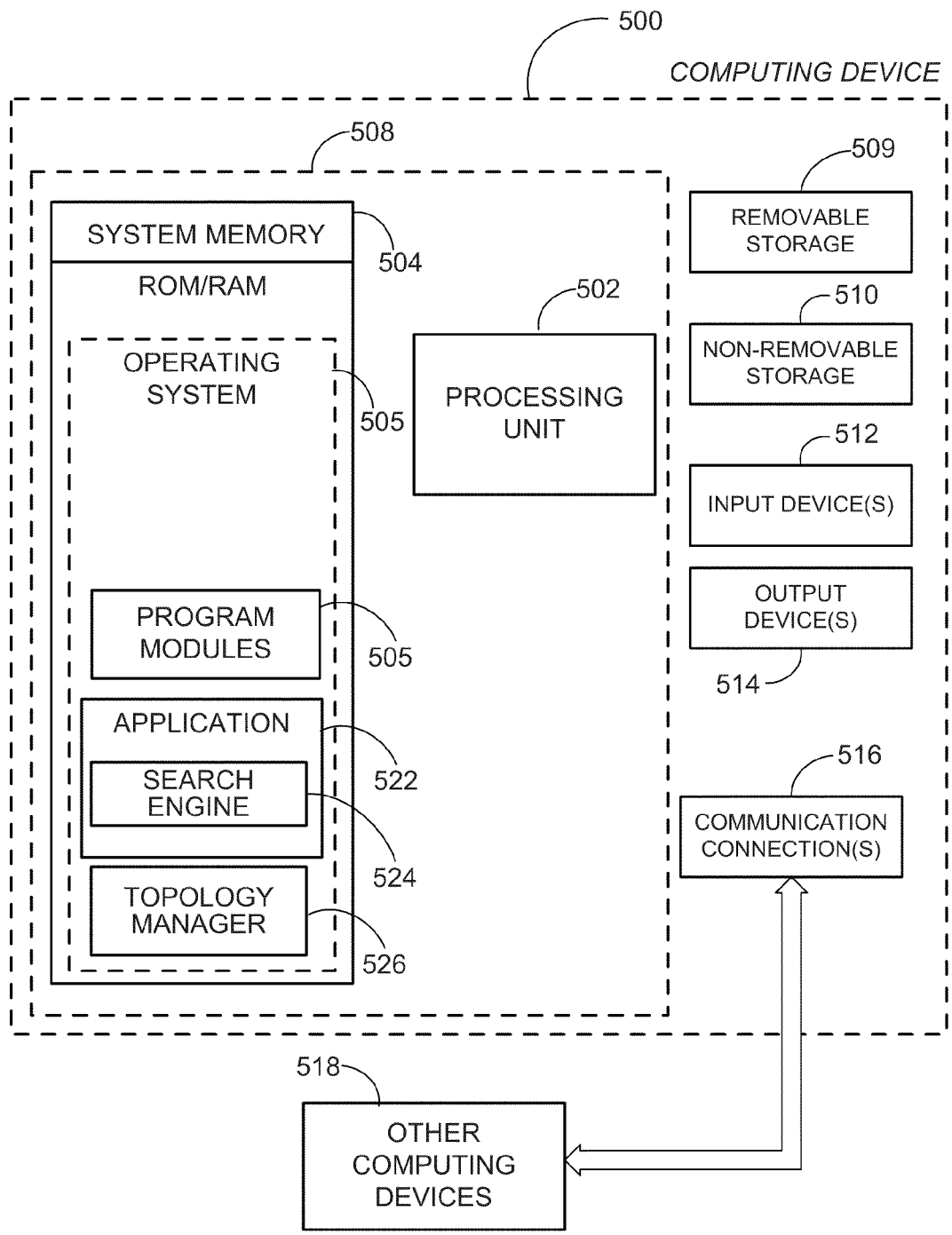
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server executing a topology manager application or module managing a search configuration wizard according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 505, search capable application 522, search engine 524, and optionally topology manager 526.

Search capable application 522 may be any application that is capable of performing search through search engine 524 on other applications/data in an enterprise-based or cloud-based networked environment from computing device 500. Search engine 524 may perform searches, index, and rank results. Topology manager 526 may manage initial topology layout through a search configuration wizard and update the topology based on changes to the system as discussed previously. Application 522 and topology manager 526 may be separate applications or an integral component of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, other web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
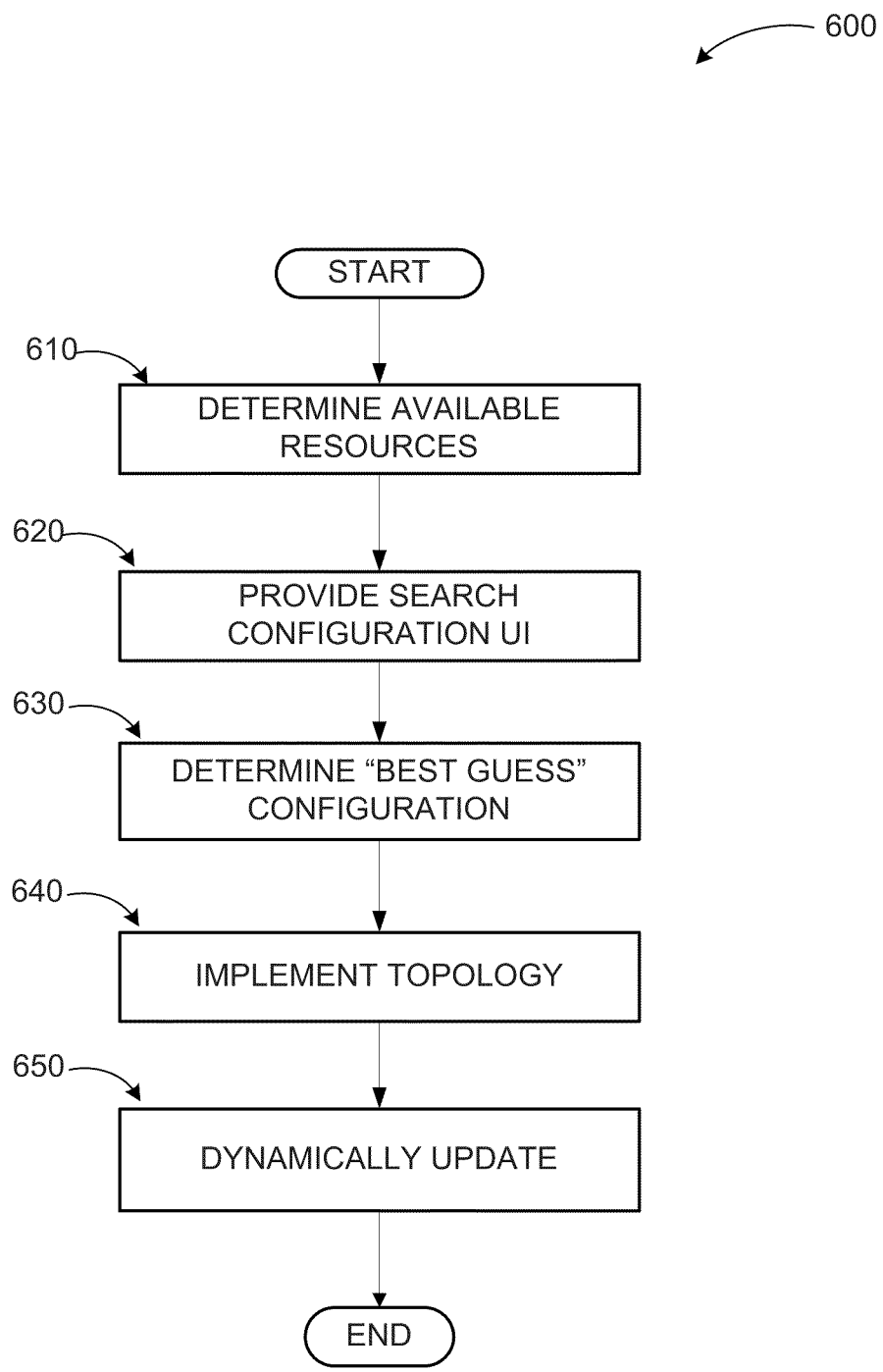
FIG. 6 illustrates a logic flow diagram for a process of configuring search topology in a shared services environment according to embodiments.

FIG. 6 illustrates a logic flow diagram for process 600 of configuring search topology in a shared services environment according to embodiments. Process 600 may be implemented as part of a search application hosted on a server.

Process 600 begins with operation 610, where a topology manager may determine available resources in the system such as various servers, applications, data sources, and so on. At operation 620, a configuration user interface may be provided to an administrator for making selections and providing input on search topology parameters such as expected document size ranges, servers/applications to be used, and comparable ones. At operation 630, a "best guess' configuration may be determined based on administrator inputs and selections for laying out the topology of servers and applications of the system for efficient search operations. The determined topology may be laid out at operation 640 and dynamically updated at operation 650 as system characteristics such as servers, applications, documents, and search needs change.

The operations included in process 600 are for illustration purposes. Automated role determination and search topology configuration may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for configuring a search topology in a networked system, the method comprising:
   determining available resources, including one or more of servers, applications and data sources in a networked shared services environment through a topology manager;
   providing a user interface for administrator selectable parameters managed by a search configuration wizard;
   suggesting selectable parameters to an administrator via the search configuration wizard including one or more of: available applications, servers and databases for a search topology based on internal lookup tables and logic for best configurations of components, and databases;
   including one or more of: one or more ranges for searchable document sizes, and numbers and types of servers and applications, associated with server roles and search limitations;
   including dynamically determined attributes of the one or more ranges in the selectable parameters based on characteristics of the system including at least one of: a size and a number of available documents in the system;
   receiving administrator selections for the parameters; and
   implementing the search topology based on the available resources and the administrator selections through an administration object model configured to interact with a search application programming interface for providing access to one or more of a query component primitive, a crawl component primitive, and a property store primitive for performing crawl and search operations.

2. The method of claim 1, further comprising:
   dynamically updating the search topology in response to changes in a number and a type of available resources, searchable documents, and user search needs.

3. The method of claim 2, further comprising:
   enabling an administrator to specify one or more ranges for searchable document sizes.

4. The method of claim 2, wherein the administrator selections include a choice for at least one of high-throughput and high-availability.

5. The method of claim 4, further comprising:
   in response to a high-throughput selection, modifying an initial search topology by adding mirrored active query components on additional servers such that high-throughput requests are accommodated.

6. The method of claim 4, further comprising:
   in response to a high-availability selection, modifying an initial search topology by adding failover query components on one of additional and existing servers to provide backup to active query components.

7. The method of claim 1, further comprising:
   enabling the administrator to specify at least one of a number and a type of servers to be included in the search topology.

8. The method of claim 7, wherein the type of servers includes one of: an application server and a database server.

9. The method of claim 1, further comprising:
   enabling the administrator to confirm the selections; and
   implementing changes in the search topology based on the confirmed selections.

10. The method of claim 1, wherein the system includes at least one from a set of: an enterprise resource planning (ERP) system, a customer relationship management (CRM) system, and a business activity monitoring (BAM) system.

11. A server for managing search topology and operations in a networked system, the server comprising:
    a memory;
    a processor coupled to the memory, the processor executing a topology manager in conjunction with instructions stored in the memory, wherein the topology manager is configured to:
    determine available servers and applications within the system;
    provide a search configuration user interface managed by a search configuration wizard for receiving administrator selectable parameters from an administrator;
    suggest selectable parameters to the administrator via the search configuration wizard including one or more of: available applications, servers and databases for a search topology based on internal lookup tables and logic for best configurations of components, and databases;

include dynamically determined attributes of displayed ranges in the selectable parameters based on characteristics of the system including at least one of: a size and a number of available documents in the system;

upon receiving administrator input, determine a search topology based on available servers and applications, administrator input, and by a process to evaluate a complexity of data in the available servers and applications to configure the search topology based on the evaluated complexity;

implementing the determined search topology through an administration object model;

enabling the administration object model to interact with a search application programming interface for providing access to one or more of: a query component primitive, a crawl component primitive, and a property store primitive;

directing a search executable to perform crawl and search operations through the search application programming interface and one or more of the query component primitive, the crawl component primitive, and the property store primitive;

storing data associated with the crawl and search operations one or more of the query component primitive, the crawl component primitive, and the property store primitive in a search application data repository; and automatically updating the implemented search topology in response to changes in a number and a type of available resources, searchable documents, and user search needs.

12. The server of claim 11, wherein the search configuration user interface is managed by the search configuration wizard executed at initial setup time.

13. The server of claim 12, wherein the search configuration wizard is configured to enable the administrator to specify a size of documents in search operations through one of: textual entry and selection among categorized ranges.

14. The server of claim 12, wherein the search configuration wizard is configured to enable the administrator to specify at least one server to be assigned a database server role.

15. The server of claim 11, wherein the search application programming interface (API) is configured to enable interaction of the administration object model with a search application and associated search data source.

16. The server of claim 11, wherein the system comprises one of: an enterprise-based network, a cloud-based network, and a combination of an enterprise-based network and a cloud-based network.

17. A computer-readable storage medium with instructions stored thereon for configuring a search topology in a networked system, the instructions comprising:

determining available servers and applications within the system;

providing a search configuration user interface, wherein the user interface includes:

an element enabling an administrator to specify one or more ranges for searchable document sizes;

an element for selecting high-throughput and high-availability search options, wherein upon selection of a high-throughput option, additional mirrored query components on new servers are provided and upon selection of a high-availability option, failover query components on existing servers are provided;

an element enabling the administrator to specify one or more servers to be associated with a search application; and an element enabling the administrator to specify roles for the one or more servers to be associated with the search application;

receiving administrator input through the search configuration user interface via one or more of: a textual input and a selection from a list of available options;

determining a search topology for the system based on available resources, administrator input, and by:
    evaluating a complexity of data in the available resources to configure the search topology based on the evaluated complexity;

implementing the determined search topology through an administration object model configured to interact with a search application programming interface for providing access to one or more of a query component primitive, a crawl component primitive, and a property store primitive for performing crawl and search operations; and updating the implemented search topology in response to changes in a number and a type of available resources, searchable documents, administrator input, and user search needs.

18. The computer-readable medium of claim 17, wherein, determining the search topology includes proposing an optimal number of application and database servers for the search application.

19. The computer-readable medium of claim 18, wherein the instructions further comprise:

determining the search topology based on lookup tables and predefined logic for optimized configurations of system components and databases.

20. The computer-readable medium of claim 17, wherein the servers include at least one from a set of: a database server and an analytics server managing topology.

* * * * *